4 Sheets--Sheet 1.

L. W. STOCKWELL.
Machines for Tapping Gas and Water Fittings

No. 152,775. Patented July 7, 1874.

Witnesses
A. B. Griffin
A. H. S. Ellman

Inventor
Levi W. Stockwell
by Bradford Howland
his Attorney.

4 Sheets--Sheet 2.

L. W. STOCKWELL.
Machines for Tapping Gas and Water Fittings

No. 152,775. Patented July 7, 1874.

Witnesses
A. B. Griffin
A. H. S. Ellman

Inventor
Levi W. Stockwell
by Bradford Howland
his Attorney.

4 Sheets--Sheet 3.

L. W. STOCKWELL.
Machines for Tapping Gas and Water Fittings

No.152,775. Patented July 7, 1874.

Witnesses
A. B. Griffin
A. H. Stillman

Inventor.
Levi W. Stockwell
by Bradford Howland
his attorney.

THE GRAPHIC CO. PHOTO-LITH. 39 & 41 PARK PLACE, N.Y.

4 Sheets--Sheet 4.

L. W. STOCKWELL.
Machines for Tapping Gas and Water Fittings
No. 152,775. Patented July 7, 1874.

Witnesses.
A. B. Griffin
A. H. Tillman

Inventor
Levi W. Stockwell
by Bradford Howland
his Attorney.

UNITED STATES PATENT OFFICE.

LEVI W. STOCKWELL, OF RAVENNA, OHIO.

IMPROVEMENT IN MACHINES FOR TAPPING GAS AND WATER FITTINGS.

Specification forming part of Letters Patent No. 152,775, dated July 7, 1874; application filed May 25, 1874.

*To all whom it may concern:*

Be it known that I, LEVI W. STOCKWELL, of Ravenna, in the county of Portage and State of Ohio, have invented certain Improvements in Gas-Pipe-Fitting Machines, of which the following is a specification:

The object of this invention is to tap gas-pipe fittings by operating several taps at the same time on one fitting, the fittings being moved and held in position to be tapped by means of an endless chain.

The four sheets of drawings, forming a part of this specification, illustrate the invention.

Figure 1:
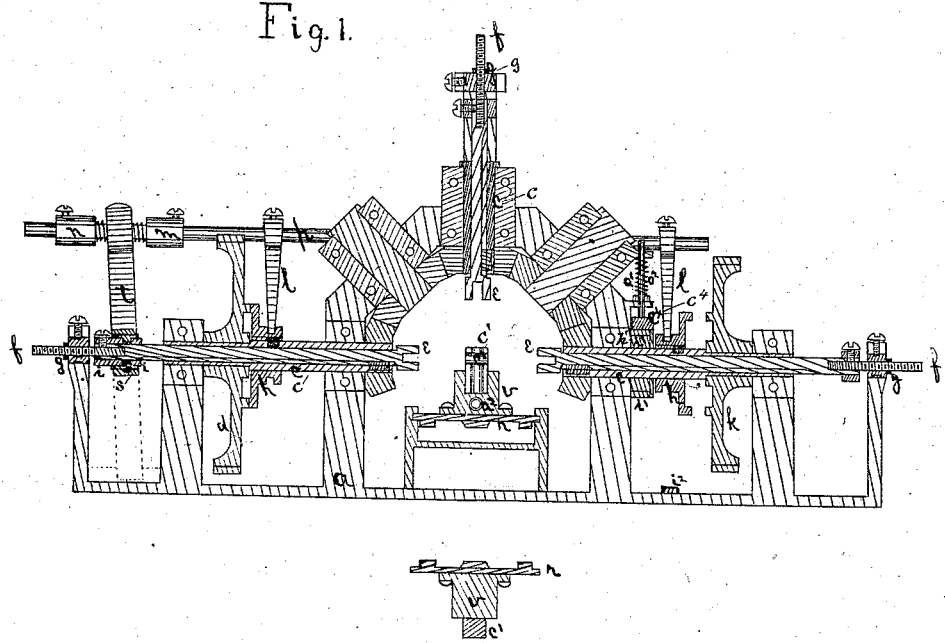
Figure 2:
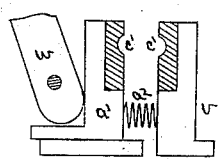
Figure 3:
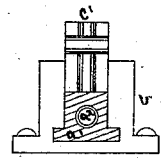
Figure 4:
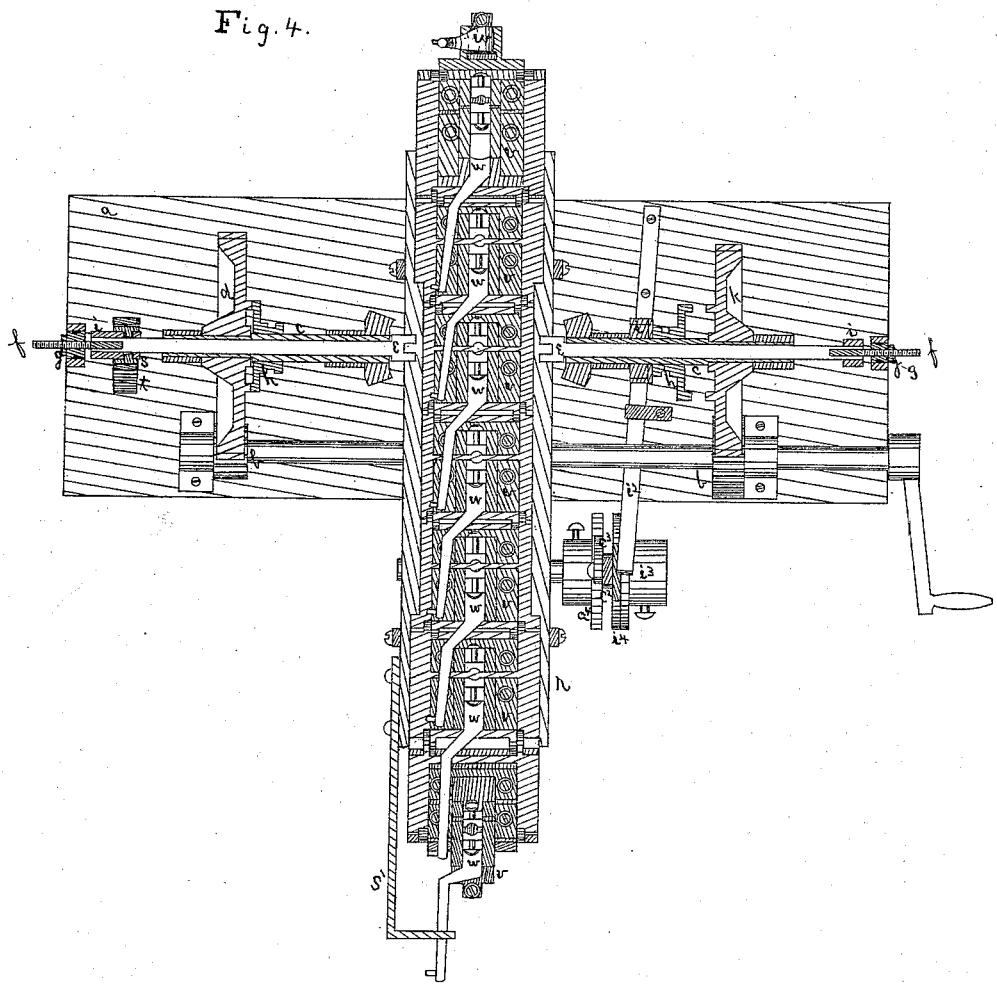
Figure 5:
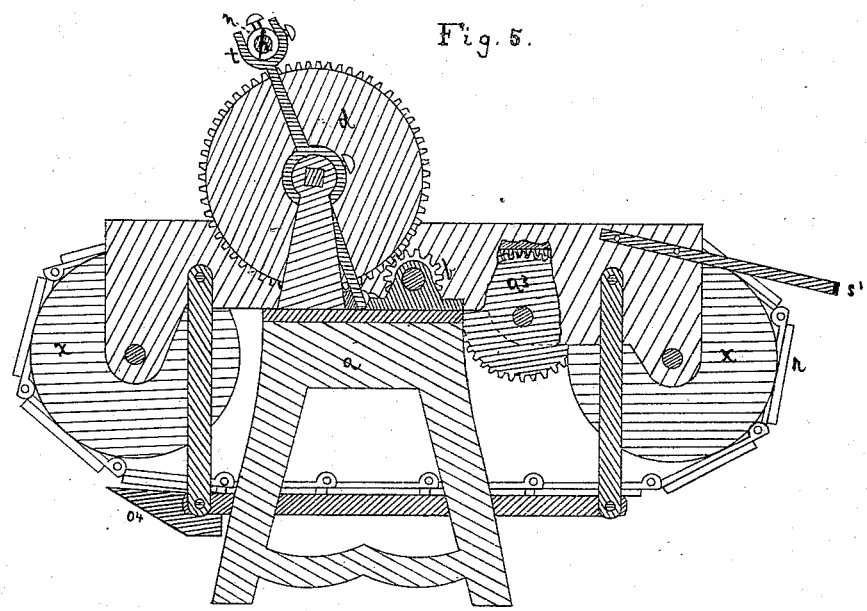
Figure 6:
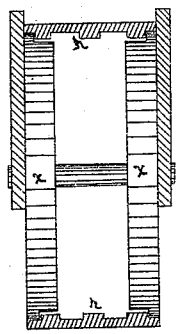
Figure 7:
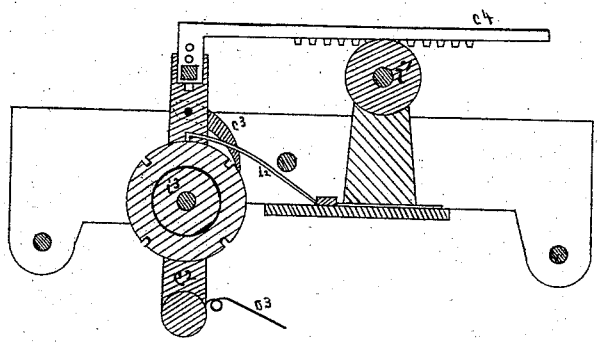
Figure 8:
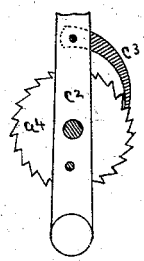
Figure 9:
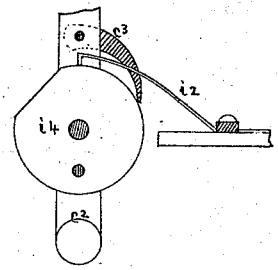

Figure 1 is a vertical section of the machine. Fig. 2 is a sectional view of the chuck to hold the fitting. Fig. 3 is a part of the chuck. Fig. 4 is a horizontal section of the machine, showing the top of the endless chain. Fig. 5 is an end view of the machine. Fig. 6 is a view of two of the wheels on which the chain turns. Figs. 7, 8, and 9 show parts by which the endless chain is operated.

$a$ is the frame of the machine. $b\ b$ are the driving-pinions, which turn the wheels $d\ k$. The wheels $d\ k$ turn loose on two of the hollow shafts $c\ c\ c$, which contain and hold the spindles $e\ e\ e$. Each of these spindles turns with its shaft, and slides on a feather in the shaft. These spindles hold the taps. Two of them are in a horizontal line with each other, and the other is above and at right angles to them, and all point toward a common center. In the outer end of each spindle the screw $f$ is fastened by means of a set-screw. $g\ g\ g$ are stationary nuts held in the frame by a set-screw. The screws $f\ f\ f$ turn in the nuts $g\ g\ g$. The shafts $c\ c\ c$ are connected by beveled gear-wheels. $h\ h$ are clutches. Each of the clutches slides on a feather on the shaft $c$, and they clutch with the wheels $d\ k$. The wheels $d\ k$ are in clutch alternately. When wheel $d$ is in clutch it turns all of the shafts $c\ c\ c$ and their spindles $e\ e\ e$ by means of the beveled gear-wheels. The spindles $e\ e\ e$ turn the screws $f\ f\ f$, and their nuts $g\ g\ g$ causing the spindles to slide on their feathers in the shafts and approach each other, thus entering and tapping the fitting. When wheel $k$ is in clutch, and wheel $d$ out of clutch, the motion of the spindles $e\ e\ e$ is reversed, causing the taps to withdraw from the fitting. To tap fittings of different sizes and different threads, the screws $f\ f\ f$ and nuts $g\ g\ g$ are changed for others with threads to correspond with the thread of the taps to be used. The clutches $h\ h$ are operated by the arms $l\ l$, which are attached to the rod $p$ by set-screws, their lower ends entering grooves around the clutches $h\ h$. The rod $p$ slides endwise in the frame of the machine, and thus operates the clutches $h\ h$. The rod $p$ is moved by the lever $t$, in the upper end of which is a loose collar, through which the rod $p$ passes. The fulcrum of lever $t$ is at its lower end, where a pin passes through it into the frame of the machine. In lever $t$, near its center, is a loose ring, $s$, which surrounds the spindle $e$ between the collars $i\ i$, attached to the spindle $e$. Lever $t$ is operated by the spindle $e$ approaching and receding from the fitting. The collars $m\ n$ on the rod $p$, each side of the lever $t$, are held by set-screws. The collars $m\ n$ are recessed to hold the spiral springs which are around the rod $p$ on each side of lever $t$, and press against the lever.

The clutches $h\ h$ are operated as follows: When wheel $d$ is in clutch, and the spindles $e\ e\ e$ are approaching each other, the lever $t$ is moved by the spindle toward the collar $m$, pressing the spiral spring back into its recess in the collar until the lever presses against the collar, and slides the rod $p$ with its arms $l\ l$, which draws the clutch away from wheel $d$, and the action of the compressed spiral spring against the collar $m$ then slides the rod $p$ until the wheel $k$ is in clutch. This reverses the motion of the spindles $e\ e\ e$ and their taps, so that they withdraw from the fitting. In doing so the motion of lever $t$ is reversed, so that it presses against collar $n$, throwing wheel $k$ out of clutch, and then the action of the spiral spring against collar $n$ moves the rod $p$ until wheel $d$ is again in clutch. The collars $m$ and $n$, the arms $l\ l$, and the fulcrum of lever $t$ are so adjusted that the clutches will be moved only when the fitting is tapped, and when the taps approach the fitting.

The nuts $g\ g\ g$ have grooves around them, and the set-screws which hold them from turning enter these grooves. By loosening the set-screws and turning the nuts, the screws $f\ f\ f$, the spindles, and taps are adjusted toward or from the fitting. The grooves in the nuts prevent the nuts from moving endwise while being turned. The endless chain $r$ turns at right angles to the shafts of wheels $d$ $k$ on wheels $x$ $x$ $x$ $x$, whose shafts turn in the frame of the chain. The upper side of the chain moves in grooves in the frame. The links of the chain are hinged together, and large enough so that a chuck, $v$, which holds the fitting, may be attached to the outside of each link by means of bolts through the chuck and link. The chuck or vise which holds the fitting is made in two parts or jaws. These jaws are adjusted for different-sized fittings by means of slots, through which they are bolted to the links. In one of these jaws the cam-lever $w$ is attached by a pin through the jaw. By moving this cam-lever, the upper part $a^1$ of the jaw is made to slide toward the other jaw, and presses the fitting and holds it in the chuck $v$. The upper part $a^1$ slides in grooves in the lower part of the jaw. When the outer end of the cam-lever $w$ is raised, the upper part $a^1$ of one of the jaws is pressed away from the other jaw by the spiral spring $a^2$ between the jaws. The ends of the spring $a^2$ rest in holes in the jaws. The liners $c^1$ $c^1$, which hold the fitting, are fastened in the jaws by screws. When the jaws are opened the fitting is placed between the liners, and then, by pressing down on the cam-lever $w$, the jaws are closed to hold the fitting. The three taps are used to tap a T-fitting, and to tap an L-fitting one of the horizontal taps is removed.

Around the chain on the inside, at the center of the chain, are teeth, which connect with the wheel $a^3$, whose shaft turns in the frame of the chain $r$. The wheel $a^3$ turns the chain $r$. On the shaft of wheel $a^3$ is placed a ratchet-wheel, $a^4$, by means of which the chain is turned. On the shaft, by the side of the ratchet-wheel $a^4$, is the lever $c^2$, on which is a pawl, $c^3$, which turns the ratchet-wheel. To the upper end of lever $c^2$ the toothed bar $c^4$ is loosely attached by a pin. This bar extends over and rests on the wheel $i^1$ on the hollow shaft $c$. There are teeth on the under side of the bar $c^4$, which connect with the toothed wheel $i^1$. The teeth on the bar and on wheel $i^1$ do not extend across the bar and wheel, but leave a part of the under surface of the bar and part of the circumference of wheel $i^1$ for the bar to rest on. When the wheel $d$ is in clutch the wheel $i^1$ turns with the hollow shaft $c$, and carries forward the bar $c^4$, and moves the lever $c^2$, ratchet-wheel $a^4$, wheel $a^3$, and chain $r$, while the taps are approaching to enter the fitting. When wheel $k$ is in clutch the bar $c^4$ is moved back with the lever $c^2$, carrying the catch $c^3$ over the teeth of the ratchet-wheel $a^4$. One-fourth of a revolution of the ratchet-wheel $a^4$ moves the chain the length of one of its links. The bar $c^4$ is so adjusted on the lever $c^2$ that when the bar is carried forward until all its teeth are beyond wheel $i^1$ the chain has been moved the length of one of its links and the fitting is in position to be tapped. The chain is held in this position while the fitting is being tapped by the end of spring $i^2$, which enters a notch in wheel $i^3$. This wheel is on the shaft of the ratchet-wheel $a^4$, and has four notches in its circumference equally distant from each other for the spring $i^2$ to enter. The wheel $i^3$ is so adjusted on the shaft that the spring $i^2$ enters a notch when the chain has moved so as to bring a fitting in position to be tapped. The spring $i^2$ is attached to the frame of the machine. The cam-wheel $i^4$ is on the shaft, between and against wheel $i^3$ and the lever $c^2$, and attached to the lever $c^2$ so as to move with it. The end of spring $i^2$ projects over the cam-wheel $i^4$, so that when the lever $c^2$ is moved back, carrying the pawl over the teeth of the ratchet-wheel, the cam-wheel $i^4$ lifts the spring $i^2$ out of the notch in wheel $i^3$, and holds it out until the motion of lever $c^2$ is reversed and the wheel $i^3$ is turned so that the spring enters another notch in the wheel $i^3$. The lower end of the pin $o^1$ rests on the top of the bar $c^4$, over the wheel $i^1$. It passes through the frame of the machine. It has a spiral spring, $o^2$, around it, which presses it down on the bar to increase the friction of the bar on wheel $i^1$, so that when the motion of wheel $i^1$ is reversed the friction of the wheel on the bar will carry the bar until the teeth of the wheel and bar are in contact. This friction is sufficient to carry the bar $c^4$ back while the pawl is passing over the teeth of the ratchet-wheel $a^4$; but when the motion is reversed to move the chain $r$, the friction of the wheel and bar, and the pressure of the spring $o^3$, attached to the lower end of lever $c^2$, against the bottom of the frame of the machine, are sufficient to move the bar $c^4$ until its teeth are in contact with the teeth of wheel $i^1$. The pawl $c^3$ is so adjusted as not to press against the teeth of the ratchet-wheel $a^4$ until the bar $c^4$ is moved forward to bring its teeth in contact with wheel $i^1$. Wheel $k$ is smaller than wheel $d$, so that the motion of the taps is increased while they are withdrawing from the fitting. Small pins project from one side of the handles of the cam-lever $w$, near the end. The cam $o^4$ is attached to the chain-frame under the chain $r$, and presses against the pins in the cam-levers $w$ as the chain turns, and thus opens the chucks $v$ and releases the fittings. On the side of the chain-frame the bent bar $s'$ is attached, which projects beyond the chain $r$, so that the cam-lever handles, which have been raised by the cam $o^4$, will be pressed down by coming in contact with the bar $s'$ as the chain turns. This is done to prevent the handles from catching in the beveled gear-wheels that connect the shafts $c$ $c$ $c$, in case, by neglect or otherwise, the cam-levers are not pressed down by hand to hold the fittings.

I claim as my invention—

1. The endless chain $r$, in combination with the chucks to hold the fittings, substantially as and for the purpose herein set forth.

2. The combination of the endless chain $r$, the wheel $a^3$, ratchet-wheel $a^4$ and pawl, lever $c^2$, bar $c^4$, and wheel $i^1$, substantially as and for the purpose herein set forth.

3. The combination of the cam $o^4$ with the endless chain $r$ and the chucks, substantially as and for the purpose herein set forth.

4. The combination of the wheels $d$ $k$ with the clutches $h$ $h$, arms $l$ $l$, rod $p$, lever $t$, collars $m$ $n$, and springs between the collars, substantially as and for the purpose herein set forth.

5. The grooved stationary nuts $g$ $g$ $g$, with their set-screws, in combination with the screws $f f f$, substantially as and for the purpose herein set forth.

6. The combination of the endless chain $r$, wheel $a^3$, ratchet $a^4$, lever $c^2$, spring $o^3$, cam-wheel $i^4$, wheel $i^3$, spring $i^2$, bar $c^4$, pin $o^1$, spring $o^2$, and wheel $i^1$, substantially as and for the purpose herein set forth.

LEVI W. STOCKWELL.

Witnesses:
  GEORGE F. ROBINSON,
  BRADFORD HOWLAND.